Nov. 4, 1924.
C. A. MICHEL
1,513,845
CORRUGATED REFLECTOR FOR AUTOMOBILE LAMPS
Filed Jan. 3, 1922   2 Sheets-Sheet 1
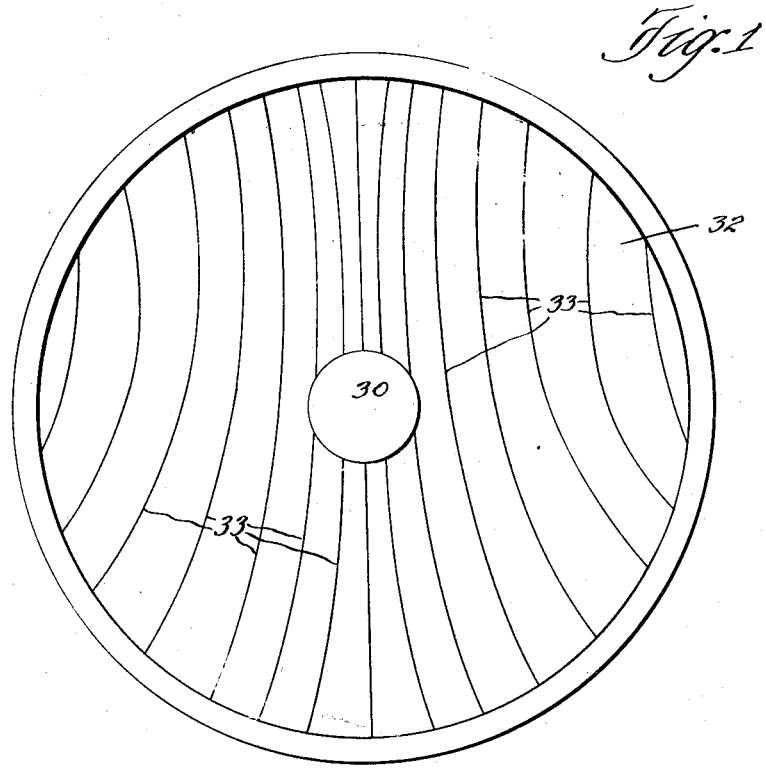
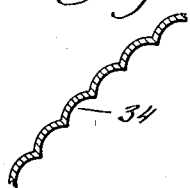
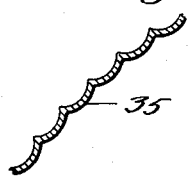
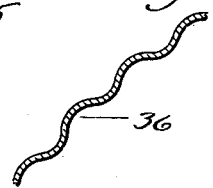
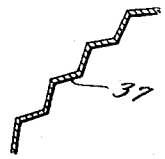
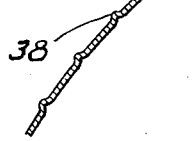

Nov. 4, 1924.   1,513,845
C. A. MICHEL
CORRUGATED REFLECTOR FOR AUTOMOBILE LAMPS
Filed Jan. 3, 1922   2 Sheets-Sheet 2
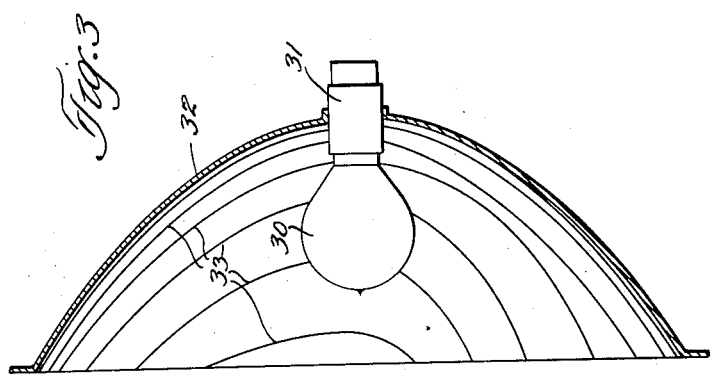
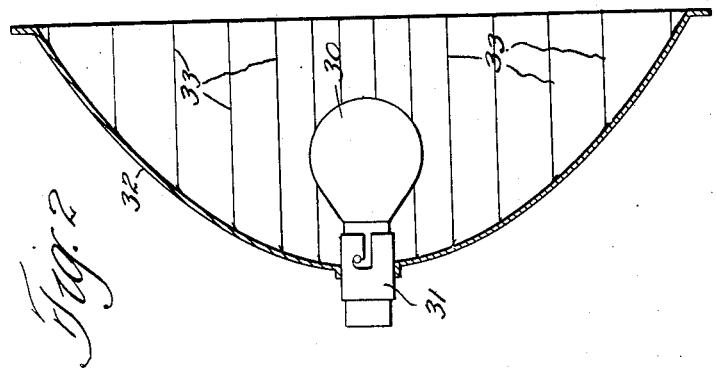

Patented Nov. 4, 1924.

1,513,845

UNITED STATES PATENT OFFICE.

CLARENCE A. MICHEL, OF CLEVELAND, OHIO, ASSIGNOR TO THE GUIDE MOTOR LAMP MANUFACTURING COMPANY, OF CLEVELAND, OHIO, A CORPORATION OF OHIO.

CORRUGATED REFLECTOR FOR AUTOMOBILE LAMPS.

Application filed January 3, 1922. Serial No. 526,680.

*To all whom it may concern:*

Be it known that I, CLARENCE A. MICHEL, a citizen of the United States, residing at Cleveland, in the county of Cuyahoga and State of Ohio, have invented a certain new and useful Improvement in Corrugated Reflectors for Automobile Lamps, of which the following is a full, clear, and exact description, reference being had to the accompanying drawings.

This invention relates generally to automobile headlights and more particularly to a novel construction of reflector used in said lamps, the object being to improve the road illumination by properly spreading the beam of light as it emanates from the lamp.

Various devices have been employed to eliminate the glare in the ordinary automobile headlight and in doing so the proper road illumination has suffered to some extent due to the fact that not enough lateral spread of the beam has been had to give the proper width of road illumination, both close to the car and in advance of the same and the object of the present invention is to overcome this objection and provide a reflector which will give a wide dispersion of the light rays and these widely diverging rays can be controlled by any suitable form of screen to cut out the glare, and without interfering with the lateral spread of the beam.

The invention consists in the novel features of construction hereinafter fully described and pointed out in the claims. In the drawings forming a part of this specification Fig. 1 is a face view of a reflector constructed in accordance with my invention; Fig. 2 is a horizontal sectional view of the same, the lamp being shown in plan; Fig. 3 is a vertical sectional view of the reflector, the lamp being shown in elevation; and Figs. 4, 5, 6, 7, 8, 9 and 10 are detail sectional views showing various ways in which the reflector body can be corrugated, ribbed or fluted.

Referring to the drawings, 30 indicates the source of light which is the ordinary incandescent lamp fixed in the socket 31 and the light is preferably arranged at the focal point of the reflector 32 which is preferably made of sheet metal and may be a conic section or the surface may be generated by a variable parabola, a variable hyperbola or a variable semi-ellipse, or any combination thereof.

In order to get a lateral divergence of the reflector rays, I propose to corrugate, rib or flute the surface of the reflector along lines produced by passing planes through the reflector which planes are oblique to the axis of the reflector and likewise oblique to the roadway.

In this manner a series of corrugations, ribs or flutes 33 are produced which diverge or converge outwardly and downwardly or which diverge or converge outwardly and upwardly, from a central plane and it will be noted that the corrugations, ribs or flutes are along curved lines as most clearly shown in Fig. 1. By this construction, I am able to get a large amount of lateral spread of the reflector rays and thereby materially improve the road illumination. In Fig. 4 the reflecting surface between the ribs is concaved as shown at 34, convexed at 35 in Fig. 5, undulating at 36, in Fig. 6, and zigzag at 37 in Fig. 7 and in Figs. 8, 9 and 10 I have shown still further modifications with broader surfaces between the ribs or corrugations. In Figure 8 the ribs are projected rearwardly as indicated at 38 and in Figure 9 they are projected forwardly as indicated at 39, whereas in Figure 10 merely angles 40 and no protruding ribs are employed.

It will thus be seen that a large variety of corrugations or ribs can be had but all upon the same general plan, that is, said corrugations, ribs or flutes are in planes oblique to the axis of the reflector and also oblique to the roadway so that said corrugations or ribs are upon curved lines oppositely disposed with reference to a central plane or line and diverging more at the bottom than at the top.

Having thus described my invention, what I claim is:

1. In a lamp, a ribbed reflector, the ribs thereof being located in planes which are oblique to the axis of the reflector and also oblique to a horizontal plane passing through the reflector.

2. In a lamp, a ribbed reflector, the ribs thereof being located in planes which are oblique to the axis of the reflector and also oblique to a horizontal plane passing through the reflector, said oblique planes converging rearwardly.

In testimony whereof, I hereunto affix my signature.

CLARENCE A. MICHEL.